March 15, 1960     E. G. PERRY     2,928,489
SEISMIC RECORD VIEWER Filed April 13, 1955     4 Sheets-Sheet 1

*Fig. 1.*

INVENTOR
*Edward Gordon Perry*

BY *Stevens, Davis, Miller and Mosher*
ATTORNEYS

Fig. 2.

INVENTOR
*Edward Gordon Perry*

BY *Stevens, Davis, Miller & Mosher*
ATTORNEYS

March 15, 1960 E. G. PERRY 2,928,489
SEISMIC RECORD VIEWER
Filed April 13, 1955 4 Sheets-Sheet 3

Fig. 3.

INVENTOR
Edward Gordon Perry

BY Stevens, Davis, Miller and Mosher
ATTORNEYS

Fig. 4.

United States Patent Office 2,928,489
Patented Mar. 15, 1960

2,928,489

SEISMIC RECORD VIEWER

Edward Gordon Perry, Dallas, Tex., assignor to Texas Instruments Incorporated, Dallas, Tex., a corporation of Delaware Application April 13, 1955, Serial No. 501,091

36 Claims. (Cl. 181—.5)

This invention relates generally to instruments for seismic surveying and more particularly to a new and novel optical oscillograph for use in connection with the analysis of records secured in seismic exploration.

In certain types of geophysical exploration and associated seismic surveys, information on sub-surface strata is derived from the recorded variations in impulses which are forced to traverse the strata.

Previously, permanent photographic records of these variations were made in the field and sent to a centralized installation for analysis. In order that these records might contain a minimum of noise and interference frequencies which sometimes obscure the useful information, it has been the general practice to convert these impulses into electrical signals and by judicious filtering of these signals eliminate such interference before recording the signal permanently by photographic means. The proper choice of the filtering to be used was determined, when possible, from previous knowledge of the geological conditions of the area. But often, of necessity, the choice was pure guesswork.

Therefore, many times in determining the proper filtering to be used in securing suitable field records from a particular survey, it was necessary to obtain several records at the first shot-point using different filter settings for each record. While the several necessary records could be made simultaneously by using multiple filtering and recording equipment at the shot-point, the amount of electronic equipment required rendered this method economically unfeasible in most cases. Where attempts were made to secure the records on consecutive shots at one location by using a single set of filters and one recorder, comparisons between the several records were difficult and inaccurate because individual charges rarely were of precisely the same strength and the several charges failed to produce the same effect. Thus, intelligent selection of the proper filtering was extremely difficult. A further complication arose when, as often happened, it became necessary to use different filtering for each shot-point in the survey.

For these reasons, there was developed a system of reproducibly recording the unfiltered signals from each shot-point and later photographically recording these signals after filtering. Thus, in case the first selection of filtering was incorrect, the original unfiltered signals were accurately preserved and could be again reproduced and recorded through different filtering. The need for a device to aid in the quick selection of proper filtering for such seismic data signals to yield the most reliable information is obvious.

To fill this need, the seismic record viewer disclosed in this specification provides a means of temporarily reproducing the seismc signals to allow selection of proper filtering before the final photographic record is made. The original data as recorded in the field is reproduced through filters of variable characteristics in a temporary form in order to determine the most promising signal record for later detailed inspection. After a number of replays of the original record sufficient to determine the optimum filtering, the invention provides for making a permanent visual record of the filtered signal. As will be developed more fully below in the detailed description, a camera arrangement incorporated within the seismic record viewer provides for practical and convenient recordation of the desired signal in permanent form.

In recording the original field record, the use of a magnetic recorder-reproducer unit has proved extremely satisfactory. More particularly, a "MagneDisc" recorder-reproducer of the type marketed by Texas Instruments Incorporated has been utilized in this application and has rendered accurate results. The signals are subsequently reproduced for the seismic record viewer of this invention from the field record obtained on the MagneDisc recorder, and as will be explained below, the motive power for the seismic viewer is derived therefrom to ensure perfect synchronization. It will be appreciated that the invention described below is by no means limited to use with the above-mentioned recorder-reproducer and that other suitable types of units may equally well be used to perform the same function.

Accordingly, therefore, a primary object of this invention is to provide an apparatus which can furnish a pictorial record of such impulses for visual analysis thereof.

Another object of this invention is to provide an improved optical oscillograph, with novel features of structure and design, for use in producing legible seismic data which will lend itself easily to geological analysis.

Another object of this invention is to provide a rugged compact oscillograph of high accuracy suitable for use in the field.

Another object of this invention is to teach a new and novel method of providing a graphical picture of the variation with time of a given phenomena.

Another object of the present invention is to provide a high accuracy oscillograph adapted for either visual or photographic recordation of the time variation of one or more variables.

A further object of the invention is to provide an optical oscillograph which utilizes a continuously rotating drum with a light sensitive coating to furnish a luminous trace thereon, and an optical viewing system which causes the image on said drum to appear stationary.

A further object of this invention is to teach a method of analyzing seismic data wherein perfect synchronism is maintained between a continuously rotating drum and the magnetic record of the seismic field data by supplying torque to the drum directly from the motor of the magnetic recorder-reproducer.

A further object is to provide an oscillograph with a direct drive to a continuously rotating circular screen as well as to the optical system to insure synchronism therebetween.

A further object of this invention is to provide an oscillograph in which the same galvonometers may be used either to energize a viewer screen or provide a photographic seismogram.

A still further object of this invention is to provide an oscillograph suitable for use in recording a changing variable on a rotating light sensitive screen and provided with optical means for viewing said screen as well as means for changing the field of view of such record by causing momentary relative motion between the light sensitive screen and the optical means.

Further objects and advantages of the invention will become apparent from the following detailed description taken in conjunction with the accompanying drawings which form a part of this disclosure and in which.

Figure 1:
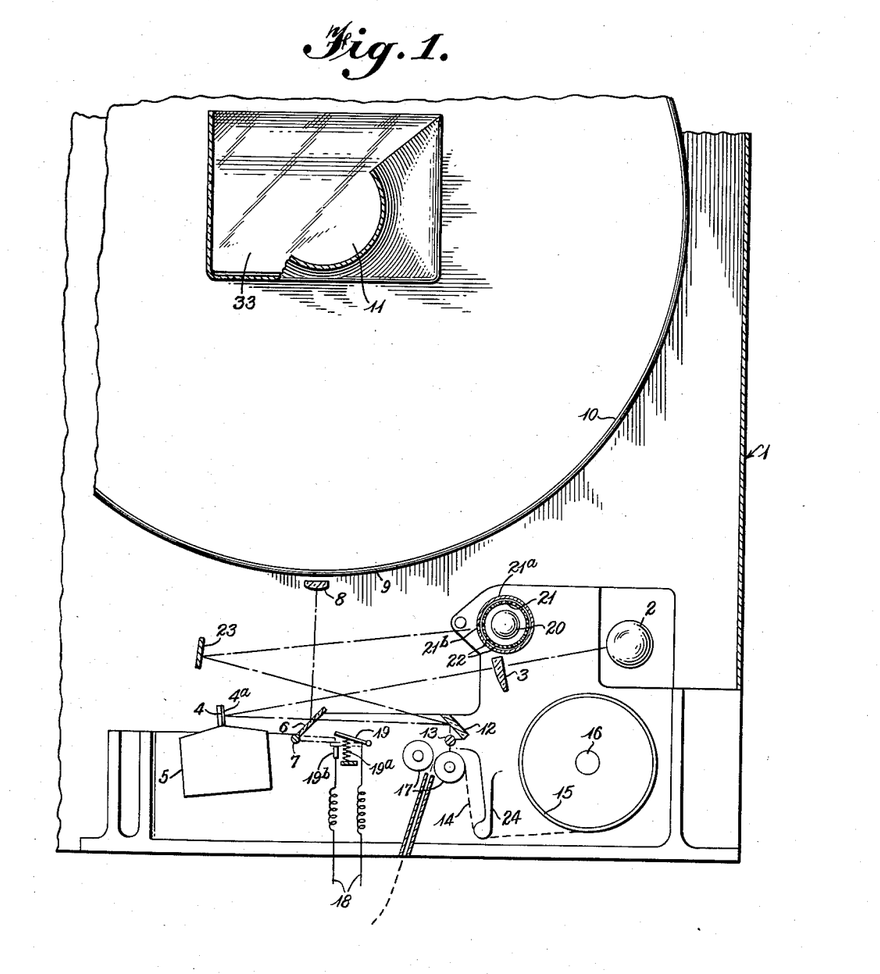
Figure 1 is a partial end view of the interior of the preferred embodiment of the invention, showing the means for generating, reflecting and utilizing the light rays.

Turning now to the drawings, and more particularly to Figure 1, the numeral 1 indicates generally an optical oscillograph characterized by a viewer-recorder unit provided with a light source or lamp 2. The rays of light emanating from the lamp 2 pass through a focusing lens 3 and impinge upon a mirror 4a, which forms a part of the galvanometer 4 supported by the galvanometer block 5. The galvanometer 4 is capable of pivotally displacing its mirror 4a in unison with undulating values of a received electrical signal, and is of conventional construction. It will be appreciated that a plurality of such galvanometers may be used in practicing the invention.

From mirror 4a of galvanometer 4 the light rays originating from lamp 2 are reflected to a redirecting mirror 6 which is pivotally mounted at 7, and which deflects the light rays from their previous path. From the surface of the mirror 6 the light rays are redirected to penetrate lens 8 and impinge upon the light sensitive outer surface 9 of a transparent drum 10. In order to facilitate the inspection of the pattern traced on the light sensitive surface of drum 10, a viewing aperture 11 is provided, and is adapted to rotate synchronously with the drum 10, in a manner which will be presently described. While visual inspection of the phenomena traced upon the light sensitive coating 9 by the action of the galvanometer is of the utmost utility, the necessity for permanent records has been recognized and provided for in the recording unit of this invention. More particularly, the pivotal mounting 7 permits the redirecting mirror 6 to be rotated downwardly to a position out of the path of the light rays which are reflected from mirror 4a. The pivotal mounting 7 connects with a knob on the exterior of the instrument (not shown) thus providing for manual actuation of the mirror.

Downward rotation of mirror 6 permits light rays from mirror 4a to arrive at mirror 12, which deflects them downwardly through lens 13 and directly into contact with the light sensitive strip 14. The strip 14 may comprise unexposed photographic film or light sensitive paper and is placed on magazine-drum 15 which in turn is rotatably mounted on shaft 16. In order to unreel strip 14 from magazine-drum 15 at an orderly controlled rate, the drive drums 17—17 are provided, and are used to apply traction to the strip as shown. The drive drums 17—17 may be powered by a conventional electric motor (not shown) which is actuated when electric current flow is instituted through conductors 18 by closing the motor switch 19. In the preferred form of the invention, the strip 14 may move past the light beams at the rate of 13 inches per second for standard recording, or at the rate of 30 inches per second for a high resolution recording. After exposure, the paper passes to a compartment below the viewer, which is not shown, where it is developed in the usual manner.

The motor switch 19 is biased to the open position by spring 19a, and is adapted to engage contact 19b when depressed. It will be readily obvious that the flow of current through the conductors 18—18 is instituted only when the redirecting mirror 6 is rotated downwardly to bring the switch 19 into conductive engagement with contact 19b.

To provide a series of spaced markings for indicating time intervals on the permanent record, a timing lamp 20 is provided within the inner drum 21. A plurality of axial slots 22 is provided in drum 21, which is rotated at a constant speed. Outer drum 21a is fixed concentrically around the inner drum 21 and is provided with a single axial slot 21b. Hence, at periodic intervals the light beam from timing lamp 20 is permitted to emerge through slots 21b and 22 and impinge upon mirror 12 and lens 13, via the mirror 23, thus providing a series of linearly spaced time markings on strip 14. In the preferred embodiment of the invention, these timing lines occur at the rate of one every ten milliseconds with wider lines every fifty milliseconds, and still wider lines every one hundred milliseconds.

The timing markings on strip 14 will be linearly spaced, and are of great utility in the analysis of the phenomenon recorded thereon. To prevent the light rays from the timing light or galvanometer mirror from contacting the unexposed portion of the strip 14, a light baffle 24 is provided to shield the strip as well as to support it during movement thereof effected by the drive-drum 17—17.

Figure 2:
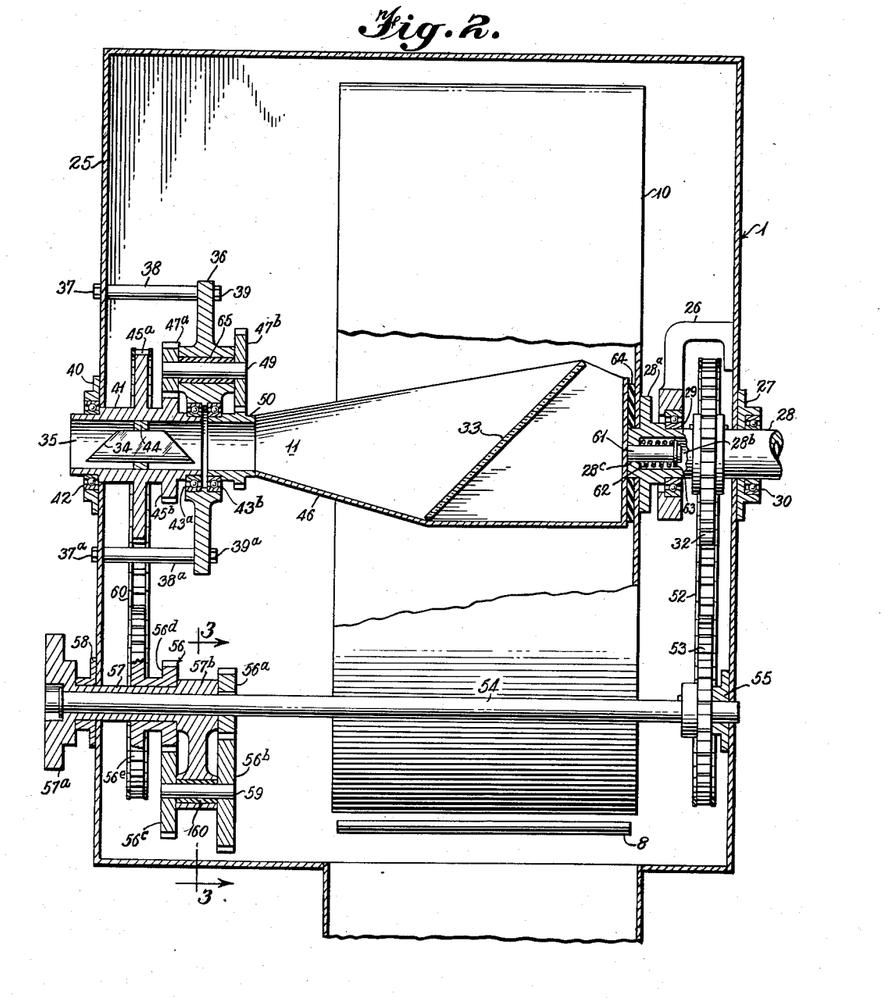
Figure 2 is a sectional side view of one form of the invention showing the organization and arrangement of the various parts.

Turning now to Figure 2, which illustrates a sectional side view of one form of the invention, the numeral 1 again indicates generally the optical oscillograph, showing the housing 25 in section, with the bearing support bracket 26 and the bearing cap 27 secured to the inner and outer walls respectively at one end thereof. The operating shaft 28 penetrates the bearing support bracket 26 as well as the bearing cap 27 and is journaled therein by means of ball bearings 29 and 30. The operating shaft 28 is rotated by means of a direct coupling to the same motor which drives the magnetic recorder-reproducer unit used in the field for making the original record. As will be appreciated more fully in view of the description below, signals are reproduced for the seismic viewer from the field record on this same magnetic recorder-reproducer. Synchronized operation of the viewer drum and magnetic record is assured because the operating shaft 28 is directly driven from the recorder-reproducer drive motor. Any suitable coupling means may be employed to couple the shaft 28 to the drive-motor of the recorder-reproducer unit, and the invention is not limited to any specific form of coupling. An annular flange 28a is provided on the inner end of shaft 28 along with an internal cylindrical recess 28b which is pierced by the hole 28c in the end of the shaft.

In order to display the undulations of the light rays from the galvanometer which penetrate the lens 8 from below, a transparent drum 10 is provided. The drum 10 abuts the flat surface of the annular flange 28a and is securely affixed to shaft 28 to rotate concentrically therewith. In order to luminesce and provide a visual trace in response to impingement of the light rays, the outer axial periphery of drum 10 is coated with a light sensitive type of material. In the preferred embodiment of the invention, a phosphorescent material which is characterized by pale green color, moderate afterglow, high black light response and fine particle size was found to be very satisfactory. Such a material is designated as G-121 and is sold by the U.S. Radium Co.

Within transparent drum 10 there is provided mirror 33 which is obliquely positioned to intercept the luminescent image on the axial periphery of the drum and redirect it to the inversion prism 34 located within the axially extending bore 35 forming an extension of the viewing aperture 11. It will be appreciated that drum 10 may be constructed of "Lucite," "Plexiglas" or any transparent material possessing sufficient structural strength.

Normally, the mirror 33 rotates in exact synchronism with the drum 10 and there results the reflection of only a single field of view to the observer. In other words, there is reflected only a single portion of the pattern on the inner periphery of the drum to the observer. Because of the rotation of the drum and the mirror, the image reflected by the mirror appears to rotate about an axis perpendicular to the plane of the image.

Without the novel optical system of this invention the image would appear right side up to the observer at one point in the rotation of the drum, and inverted, or upside down after the assembly had been rotated 180° therefrom.

A prism 34 shown within the bore of the hub 41 effectively eliminates this constant inversion. A prism of this type has the property of reversing an image seen through it, such that when the short upper edge and the long lower edge are in a horizontal plane, the image is inverted. However, when the short and long edges are rotated 90° to fall in the vertical plane, an erect but mirror image is produced. Thus, for every 180° rotation of the prism, the image seen therethrough is rotated a full 360°. Hence, the combination of the rotating mirror and the above-described type of rotating prism rotating at one-half the angular velocity of the mirror produces an image embracing a single section of the drum in which the image appears stationary.

The means for mounting and rotating the mirror 33 and the prism 34 will now be explained. Bracket 36 is securely affixed in spaced relation to the inner wall of housing 25 by means of bolts 37—37a, spacers 38—38a, and nuts 39—39a respectively. Hub 41 is rotatably journaled by means of ball bearings 42 and 43a respectively between bracket 36 and the bearing cap 40, which is secured to the outer wall of the housing 25. Within hub 41 there is provided an axially extending bore 35 which houses the inversion prism 34 by means of a suitable spacer 44. To provide driving torque for rotation of hub 41 there is affixed thereto a sprocket 45a which may be driven by a suitable chain drive, as will be explained more fully below. To provide turning torque for the mirror support 46, which is journaled in bracket 36 by means of ball bearings 43b, there is provided a pair of drive-gears 47a and 47b respectively. The drive-gears 47a and 47b are keyed or otherwise affixed to stub shaft 49 which is journaled in the bushing 65 within bracket 36. In operation, rotation of the hub 41 by means of the sprocket 45a effects a similar rotation of gear section 45b which is securely affixed to hub 41. Since drive-gear section 47a meshes with gear section 45b and is keyed to the common stub shaft 49 along with drive-gear 47b, it will be obvious that rotation of hub 41 causes a corresponding rotation of the drive-gear 47b.

Since the mirror support 46 is provided with gear section 50 which directly engages drive-gear 47b and rotates therewith, it is believed that rotation of the mirror support in response to rotation of the hub 41 is sufficiently clear to render further detailed explanation unnecessary.

Continuing now with the detailed description, the method of rotating the mirror support 46 and hub 41 in controlled time relationship with the drum 10 will now be explained. Sprocket 32 is keyed to shaft 28 between the inner wall of housing 25 and the bearing support bracket 26, and is engaged by chain 52 which also engages the sprocket 53 which is keyed to the differential shaft 54. The differential shaft 54 is journaled between the cap 55 and the differential gearing mechanism indicated generally by the numeral 56 which will be explained more fully below. It will be observed that the bushing 57 of the differential mechanism is itself journaled in cap 58, which is mounted upon the outer wall of housing 25.

When sprocket 53 is rotated by movement of the chain 52, the differential shaft 54 is forced to rotate and, consequently, pinion gear 56a which is keyed to shaft 54 must also rotate and drive gear 56b. However, gears 56b and 56c are both affixed to stub shaft 59 which is journaled in the annular anti-friction liner 160. Torque is supplied to gear section 56d by gear 56c, and since the sprocket 56e which engages chain 60 is integrally connected to gear section 56d, the rotation of the hub 41 in response to rotation of the operating shaft 28 is believed evident.

In general, since the mirror 33 must rotate in exact synchronism with the transparent drum 10, the relation between the drive-gears 47a—47b and the sprocket 45a must be such as to rotate gear 50 of the mirror support at precisely the same angular velocity as operating shaft 28. However, a gear-ratio must be used which causes the hub 41 and associated prism 34 to revolve at one-half the angular velocity of the operating shaft, the drum, and the mirror. With regard to the means for transferring torque from the operating shaft 28 to the hub 41 and mirror support 46, it will be understood that the invention is not limited to sprocket and chain drives, and pulley discs driven by belts may be substituted for the sprockets 32, 53, 56e and 45a as earlier disclosed.

In viewing the traces reflected by the mirror 33 from the axial surface of drum 10, means have been provided for varying the relative angularity between the drum and mirror, thus changing the field of view and making possible equally minute inspection of all portions of the displayed phenomena. The mirror support terminates in a shaft 61 which is integral therewith and extends through hole 28c into the cylindrical recess 28b in the operating shaft. Within the recess 28b a coil spring 62 is mounted concentrically with shaft 61 and is maintained in axial compression thereon by spring retainer element 63. Between the flat end wall of mirror support 46 and the plane surface of drum 10 where is interposed a flat friction gasket 64. While the effect of spring 62 is to urge the mirror support 46 to maintain the same angular position relative to drum 10, the gasket 64 functions as a friction clutch which will slip when any substantial retarding force is applied to the mirror support.

For instance, when it is desired to change the field of view of mirror 33, the normally stationary handle 57a of the differential gearing mechanism may be rotated in either direction. This, of course, will rotate the bushing 57 and the bushing-bracket 57b, and cause gears 56c and 56b to move about gear 56d and pinion 56a respectively. Accordingly, this will cause pinion 56a to deliver torque to gear 56b and all successive elements in the gear train therebeyond at a different relative angular position with respect to the operating shaft 28 and thereby produce a momentary rotation of the mirror with respect to the drum. It will be appreciated that the handle 57a is normally maintained stationary, and does not revolve with the differential shaft 54, but serves merely to journal the shaft 54 until it is desired to change the field of view of the mirror 33.

It will be appreciated that the reflections from within drum 10 may be secured equally well by means of a right triangular prism centrally located therein, and that the invention is not limited solely to the use of a mirror, such as mirror 33, for deflecting the luminous patterns to the viewing aperture.

Figure 3:
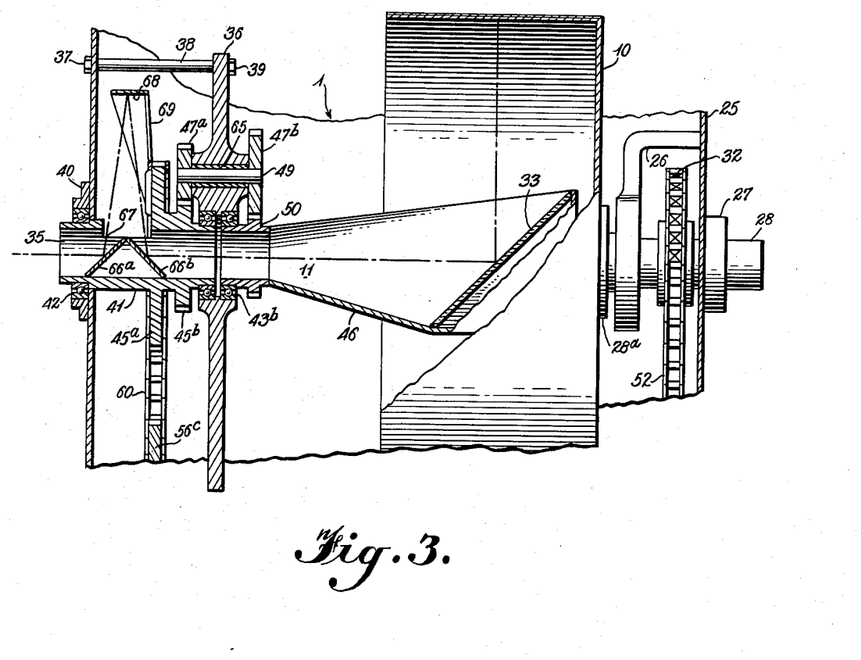
Figure 3 illustrates a fragmentary view of a modification of the embodiment shown in Figure 2.

Turning now to Figure 3, there is illustrated a fragmentary view of a modified form of the invention, using mirrors within the bore of hub 41, in place of the inversion prism illustrated in Figure 2. In Figure 3 the luminous trace on the axial surface of the light sensitive drum 10 is reflected in mirror 33. Within hub 41 there is mounted a pair of mirrors 66a and 66b which are angularly disposed with respect to each other as shown in the drawing. The outer wall of hub 41 is provided with an axial slot 67 which penetrates completely therethrough, and a mirror 68 which is radially aligned with said axial slot by means of mirror support bracket 69.

Images from the surface of the drum which are reflected to mirror 66b from the mirror 33 are caused to reappear in mirror 66a by means of mirror 68. More particularly, light rays from mirror 33 which are incident upon mirror 66b are deflected to mirror 68 through axial slot 67, where they are redirected downwardly to impinge upon the mirror 66a and provide a visible record of the luminescent pattern traced upon the drum by light rays from the galvanometers. It will be appreciated that the action of the mirrors 66b, 66a and 68 in Figure 3 is identical with that of the prism 34 depicted in Figure 2 and Figure 4, and that this mirror arrangement produces image inversion in the same manner as does the prism.

It will be appreciated that the method and apparatus in Figure 3 for supplying torque to drum 10, as well as to hub 41 and mirror support 46, may comprise a chain and sprocket drive as provided in Figure 2. Or, alternatively, the torque transfer system utilized in Figure 3, like that in Figure 2, is readily adaptable to pulley-disc and belt drive, and is by no means limited to chain and sprocket drive.

Figure 4:
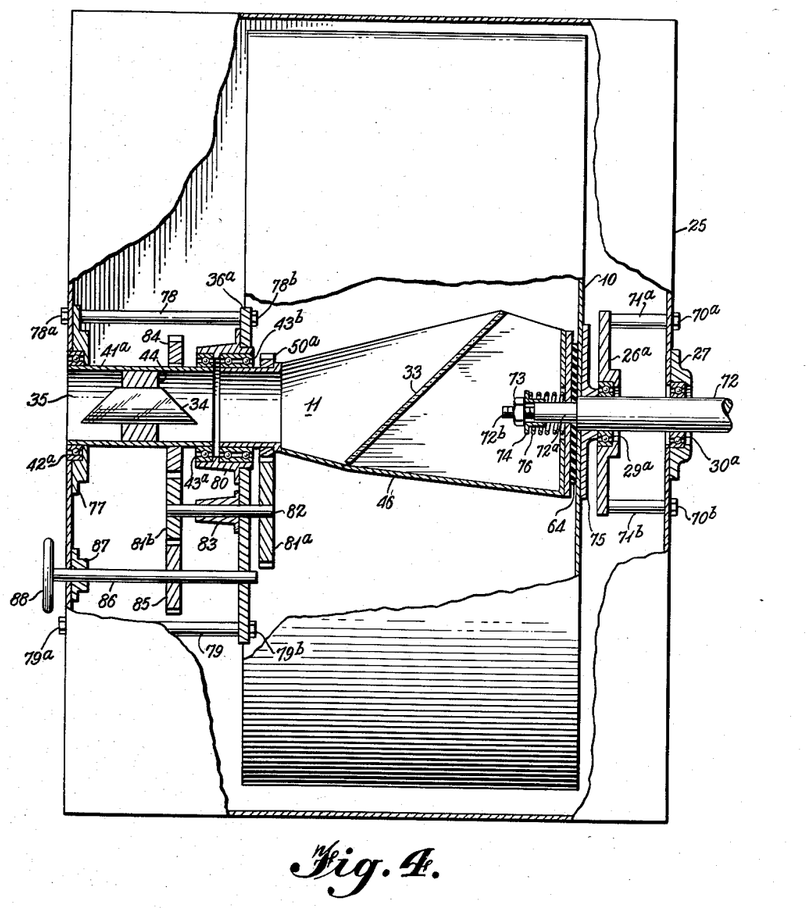
Figure 4 shows a fragmentary view of a modified form of the invention.

Turning now to Figure 4 and the detailed description thereof, there is shown a fragmentary view of a modified form of the invention. Bearing cap 27 is affixed to the outside wall of housing 25, and bearing support bracket 26a is rigidly secured in spaced relation with respect thereto by bolts 70a—70b and spacers 71a—71b respectively. Operating shaft 72 is journaled between cap 27 and bracket 26a by means of ball bearings 29a and 30a, and is characterized by a necked-down section 72a and a threaded section 72b. A shaft-nut 73 is threaded onto the threaded portion 72b and abuts a compression-washer 74.

Drum 10 and spacer-flange 75 are mounted on operating shaft 72, and mirror support 46 is positioned on the necked-down section 72a to abut the flat friction gasket 64 which is interposed between the mirror support and drum. Mirror support 46 is urged to resiliently abut the friction gasket 64 and turn in synchronism with drum 10 by means of the spring 76 which is interposed between washer 74 and the inner wall of the mirror support. The tension on the spring 76 may be readily adjusted by turning the shaft-nut 73 and moving the compression-washer 74 along the axis of the necked-down portion 72a of shaft 72.

Proceeding now to the method used in Figure 4 for transferring torque to the gearing system for the hub 41a, there is shown a bearing cap 77 affixed to the inner wall of the housing 25. Additionally, a bearing support plate 36a is rigidly secured in spaced relationship to the wall 25 by means of studs 78 and 79 each of which is threadedly engaged in both ends thereof by suitable nuts 78a—78b and 79a—79b respectively. A bearing support flange 80 is affixed to plate 36a by suitable means, and the hub 41a is journaled between cap 77 and flange 80 by means of ball bearings 42a and 43a respectively. Within hub 41a the inversion prism 34 is secured by a suitable spacer 44. It will be appreciated that the optical system shown in Figure 3 is equally applicable herein, and that the modification shown in Figure 4 may utilize the mirror system taught in Figure 3 equally well. The mirror support 46 is provided with the gear section 50a which is securely affixed thereto, and ball bearings 43b are provided to journal the mirror box in bearing support flange 80.

The gear section 50a engages a drive-gear 81a which is securely affixed to a common stub shaft 82 to which is also secured a second drive-gear 81b at the opposite end thereof.

A cylindrical stub shaft support 83 is secured to plate 36a and the stub shaft 82 is journaled in a smooth hole which penetrates said plate and attached support.

The drive-gear 81b engages with and provides a turning moment to gear section 84 which is securely mounted upon hub 41a to revolve therewith. It will be appreciated that gear section 84 in Figure 4 performs the same function as the sprocket 45a in Figure 2, which is to revolve the hub and associated prism located therewithin. The drive-gear 81b also supplies turning torque to gear 85 which is keyed or otherwise affixed to rod 86. The rod 86 is journaled for rotation between plate 36a and the support bushing 87 mounted as shown on the inner wall of housing 25.

A disc or knob 88 is affixed to rod 86 and revolves continuously therewith whenever the gear section 50a on mirror support 56 is rotated. When drum 10 is caused to rotate synchronously with operating rod 72 by its frictional engagement therewith in this embodiment of the invention, gear section 50a will spin the drive gear 81a and cause the hub 41a to revolve at one-half the angular velocity of the drum. Additionally, knob 88 will continue to turn during this period.

Because of the rotation of mirror 33 and prism 34, and the relative motion therebetween, the trace reflected from the drum surface will appear stationary to the observer as in the earlier-taught embodiments. When it is desired to inspect a different portion of the pattern which is traced on the drum surface, the knob 88 may be turned either slower or faster than its normal rotational speed. When this is done, gear 85 will supply torque via drive-gears 81a and 81b to gear section 50a on the mirror support. Then, friction gasket 64 and spring 76 will permit the mirror support to slip with respect to the drum 10, and mirror 33 may be readily aligned with a new section on the axial periphery thereof.

Thus, the embodiment shown in Figure 4 is to be distinguished from that shown in Figure 2 and Figure 3. In the latter mentioned figures, the hub and associated prism are supplied torque primarily by means of the differential shaft 54 and associated gearing, while in Figure 4 the hub and prism are geared directly to the mirror support and driven therefrom. In Figure 2 and Figure 3 the field of view of the mirror 33 is adjusted by manually causing the differential gears to move about the pinion, and the adjusting knob 57a normally remains stationary. However, in the embodiment shown in Figure 4 the field of view is changed by turning a continuously rotating knob 88 either slower or faster in order to drive the mirror support at an angular speed different from that of the transparent drum. It is noteworthy that in all of the modifications of the invention, the mirror support is capable of slipping in a manner analogous to that of a friction clutch in order to change the field of view. In the embodiment shown in Figure 4, the positive synchronization is maintained between the recorder-reproducer used to record in the field and the viewer-recorder of this invention, by driving the shaft 72 directly from the motor of the recorder-reproducer unit.

Therefore, while I have illustrated and described practical and efficient forms of my invention, suitable for the proposed uses, it will be readily understood that various modifications, alterations and substitutions may be made therein without departing from the true spirit and scope of the invention as defined in the appended claims.

What is claimed is:

1. In an optical oscillograph for producing a light beam which oscillates in phase with the time variation of a variable, a housing, an operating shaft provided with a cylindrical internal recess therein and journaled for rotation in a first wall of said housing, a first sprocket affixed to said operating shaft, a bracket secured in spaced relation to an opposite wall of said housing and provided with a hollow bushing extending transversely therethrough, a stub shaft rotatably disposed in said bushing, a pair of drive-gears affixed each to an opposite end of said stub shaft, a transparent drum provided with a light-sensitive coating on the outer axial periphery thereof and secured to said operating shaft to rotate therewith, a mirror support rotatably journaled at one end in said bracket and provided at the other end with a flat surface terminating in a shaft, said last mentioned shaft positioned to penetrate said recess in said operating shaft; said mirror support further provided with a gear section integrally attached thereto to engage one of said drive-gears; a friction gasket disposed between said drum and said flat surface of said mirror support, tensile biasing means mounted within said recess in said operating shaft to resiliently urge said flat surface of said mirror support to engage said friction gasket, a mirror obliquely secured in said mirror support with respect to the axis of said drum and aligned to reflect images on the periphery thereof, a hub provided with an axial bore and journaled for rotation between said opposite wall and said bracket, said hub further provided with a gear section integrally attached thereto to engage the other of said drive-gears; a second sprocket secured to said hub to deliver torque thereto, a prism secured in said bore of said hub to receive and invert images reflected from said mirror, a differential shaft including a third sprocket mounted parallel to said drum and journaled between said first wall and said opposite wall; a differential gearing unit mounted upon said differential shaft to receive torque therefrom and including a fourth sprocket, a first chain operatively connecting said first and third sprockets, a second chain operatively connecting said second and fourth sprockets, and means to actuate said differential mechanism about said differential shaft to change the field of view of said mirror with respect to the inner periphery of said drum.

2. In an optical oscillograph of the type adapted to receive torque from a magnetic recorder-reproducer unit, a viewer-recorder unit including at least one galvanometer unit for producing an oscillating light beam in accordance with the undulations in the value of an input signal, a housing, an operating shaft journaled for rotation in one wall of said housing, a transparent hollow drum provided with a light-sensitive coating on the outer axial surface thereof and affixed to said operating shaft to rotate therewith, said light beam falling on said outer axial surface of said drum, a bracket affixed in spaced relation to an opposite wall of said housing and provided with a pair of cylindrical holes extending transversely therethrough, a friction gasket centered on said operating shaft to abut the radial wall of said transparent drum, a stub shaft rotatably journaled in the first of said holes in said bracket, a pair of drive-gears affixed each to an opposite end respectively of said stub shaft; a hub provided with a hollow bore and journaled between said opposite wall and said bracket to rotate concentrically with the second of said pair of cylindrical holes therein, said hub having a gear section affixed to the outer portion thereof to engage the first of said drive-gears on said stub shaft; a prism mounted within said bore of said hub to rotate therewith, a mirror support provided at one end with a flat surface to abut said friction gasket within said drum, and journaled at the opposite end in said bracket to rotate concentrically with said second hole therein, said mirror support provided with a gear section affixed thereto to engage the second of said drive-gears; tensile biasing means mounted to constantly urge said flat surface of said mirror support to resiliently abut said friction gasket, a mirror secured within said mirror support to reflect images from the outer axial surface of said drum to said prism, a differential shaft journaled between said one wall and said opposite wall of said housing parallel with said axis of said drum; a torque transfer system comprising a first sprocket secured to said operating shaft, a second sprocket secured to said hub, a third sprocket secured on said differential shaft opposite said first sprocket with a first chain operatively disposed therebetween, a differential gearing mechanism including a fourth sprocket rotatably mounted on said differential shaft opposite said first sprocket with a second chain operatively disposed therebetween, and normally stationary means to revolve said differential mechanism about said differential shaft to cause said mirror support to slip momentarily on said gasket to present a new field of view for said mirror within said mirror support.

3. In an optical oscillograph of the type adapted to produce a graphical record of the undulations in the value of an incoming electrical signal, a housing, an operating shaft mounted to penetrate a wall of said housing and rotate therein, a transparent cylinder secured at one end to said operating shaft to rotate concentrically therewith and provided with a light-sensitive coating on the outer axial surface thereof; means to generate and focus a light beam on said light-sensitive surface to trace an image thereon, including means to oscillate said light beam in response to variations in the strength of said incoming signal; first reflection means mounted within said drum to reproduce said image on said light-sensitive surface thereof while turning synchronously with said drum, support means to house and secure said first reflecting means, second reflecting means axially aligned with first reflecting means to receive and invert images reflected therefrom, hub means to secure said second reflecting means, drive-gear means to transfer torque from said hub means to said support means, a differential shaft mounted to rotate parallel to the axis of said transparent drum, manually operable differential means to change the portion of the patterns on said drum intercepted by said first reflecting means, and torque transfer means comprising means to transfer torque from said operating shaft to said differential shaft, and means to transfer torque from said differential means to said hub means.

4. A device as claimed in claim 3 in which said torque transfer means comprises a first sprocket secured to said operating shaft, a second sprocket secured to said hub, a third sprocket secured to said differential shaft opposite said first sprocket, a fourth sprocket comprising a part of said differential means, and chain means connected between said first and third sprockets and between said second and fourth sprockets respectively.

5. A device as claimed in claim 3 in which said torque transfer means comprises a first pulley disc secured to said operating shaft, a second pulley secured to said hub, a third pulley disc secured to said differential shaft opposite said first pulley disc, a fourth pulley disc comprising a part of said differential means, and, belt means connected between said first and third pulley discs and between said second and fourth pulley discs respectively.

6. A device as claimed in claim 3 in which said first reflecting means comprises a mirror positioned obliquely with respect to the axial center line of said drum.

7. A device as claimed in claim 3 in which said first reflecting means comprises a prism obliquely disposed with respect to the axis of said drum.

8. A device as claimed in claim 3 in which said differential means comprises an annular elongated bushing rotatably mounted on said differential shaft, a handle integrally affixed to an end of said bushing and terminating outside a wall of said housing, a bushing bracket integrally attached to the opposite end of said bushing and journaled therewith on said differential shaft, said bushing bracket provided with a cylindrical hole parallel to said differential shaft and a stub shaft adapted to rotate therein, a pair of gears affixed respectively to opposite ends of said stub shaft, a pinion affixed to said differential shaft to rotate therewith and engage one of said gears affixed to said stub shaft, a sprocket rotatably mounted on said bushing, and a gear section integrally attached to said sprocket to revolve concentrically therewith and positioned to engage the other of said gears secured to said stub shaft.

9. A device as claimed in claim 3 in which said differential means comprises an annular elongated bushing rotatably mounted on said differential shaft, a handle integrally affixed to an end of said bushing and terminating outside a wall of said housing, a bushing bracket integrally attached to the opposite end of said bushing and journaled therewith on said differential shaft, said bushing bracket provided with a cylindrical hole therethrough parallel to said differential shaft and a stub shaft adapted to rotate therein, a pair of gears affixed respectively to opposite ends of said stub shaft, a pinion affixed to said differential shaft to rotate therewith and engage one of said gears on said stub shaft, a pulley disc rotatably mounted on said bushing, and a gear section positioned to engage the other of said gears secured to said stub shaft.

10. In an optical oscillograph of the type adapted to receive an input signal from a recorder-reproducer including a motor, housing means, transparent drum means mounted for rotation within said housing means and having a light-sensitive surface, means to produce an oscillating light beam and direct same into contact with said light-sensitive surface to produce a luminescent pattern thereupon, shaft means connected to drive said drum means, first reflector means mounted within said drum means to read the luminous pattern thereupon, differential means to change the relative angularity of said first reflector means with respect to said drum means, friction clutch means to permit said first reflector means to momentarily revolve at an angular velocity different from that of said drum means, second reflector means aligned with said first reflector means to reflect images therein and revolve in controlled time relationship therewith, torque transfer means to revolve said second reflector means, said differential means and said first reflector means in controlled time relation, recorder means including a motor to move a light-sensitive strip to intercept said light beam and provide a record thereof, and means coupling said shaft to the motor of said recorder-reproducer means to derive torque therefrom.

11. In an optical oscillograph characterized by means to produce an oscillating light beam and provided with a housing, and a bracket secured to the inner wall of said housing having at least one cylindrical hole therethrough, a rotatable light-sensitive drum surface to intercept said light beam, a reflector means mounted within said drum surface receiving the pattern traced by said light beam thereupon, an image inversion means which include a hub provided with a hollow axial bore and journaled between said housing and said bracket for concentric rotation with said cylindrical hole therein, a mirror support bracket affixed to said hub to rotate therewith, a first mirror secured within said hub at an angle with respect to the axis thereof to reflect images in said reflector means, a second mirror affixed to said mirror support bracket in radial alignment with said first mirror to read images therein, and a third mirror angularly disposed within said bore with respect to the axis thereof to read images reflected from said second mirror.

12. In an optical oscillograph, a housing, at least one light source to produce a beam of light, a transparent rotatable means including a light-sensitive surface to intercept said beam of light, means to rotate said rotatable means, means to oscillate the light beam from said light source and focus said beam on said light-sensitive surface, reflector means mounted within said rotating means to rotate synchronously therewith and receive patterns through the inner surface thereof, a hub provided with an axial bore aligned with the axis of said reflector means and journaled for rotation therewith, said hub further provided with a slot in the outer wall thereof; a pair of mirrors angularly disposed in said bore with respect to each other and the axis thereof, a mirror support bracket affixed to said hub to rotate therewith, and, a mirror secured to said support bracket in radial alignment with said slot in said bore and with said pair of mirrors therein.

13. In an oscillograph of the type adapted to receive an input signal, a housing, an operating shaft rotatably mounted in a wall of said housing, a transparent drum mounted on said shaft and provided with a light-sensitive coating on the outer axial surface thereof, a friction gasket centered on said operating shaft to abut the flat inner wall surface of said drum, means to produce at least one beam of light and apply same to said light-sensitive surface of said drum, means to oscillate said beam substantially in phase with variations in the strength of said incoming input signal, a bracket affixed in spaced relationship with the opposite wall of said housing and provided with at least three cylindrical holes penetrating transversely therethrough, a mirror support having a flat surface with an access hole therethrough in one end thereof, and journaled for concentric rotation with a first hole in said bracket at the opposite end thereof, said access hole positioned for penetration by said operating shaft to cause said flat surface to abut said friction gasket; first reflector means positioned obliquely within said mirror support at an angle to the axis thereof; tensile biasing means to urge said flat surface into resilient abutting engagement with said gasket to allow said mirror support and said drum to rotate synchronously; a stub shaft rotatably disposed within a second hole in said bracket, a pair of drive-gears secured respectively to opposite ends of said stub shaft; a rod journaled between said opposite wall of said housing and a third hole in said bracket, said rod provided with a gear secured thereto to engage a first of said drive-gears and terminating in a knob outside of said housing; a hub provided with an axial bore therethrough and journaled between said opposite wall and said bracket, second reflector means secured within the bore of said hub in alignment with said first reflector means, a gear section affixed to said hub to mesh with the first of said drive-gears, and a gear section affixed to said mirror support to engage the second of said drive-gears.

14. A device as claimed in claim 13 in which said first reflector means comprises a prism having a face obliquely disposed with respect to the axis of the drum.

15. A device as claimed in claim 13 in which said first reflector means comprises a mirror having a flat reflecting face obliquely disposed with respect to the axis of said drum.

16. A device as claimed in claim 13 in which said portion of said operating shaft which penetrates said hole in said flat end surface of said mirror support is provided with a threaded portion at the end of said shaft, a nut engaging said threaded portion, a compression washer engaging the under side of said nut, and a spring interposed between the inner wall of said flat end surface and said compression washer to bias said mirror support into resilient engagement with said friction gasket.

17. In an oscillograph of the type adapted to receive an input signal, and oscillate at least one light beam in unison therewith, housing means, shaft means journaled for rotation in said housing means, transparent drum means having a luminescent surface secured to said shaft means for rotation therewith to intercept said first-mentioned light beam and luminesce therefrom, first reflector means positioned within said transparent drum means to normally rotate therewith, support means mounted to secure said reflector means and rotate therewith, second reflector means mounted to receive an image reflected from said first reflector means, hub means mounted to secure and rotate said second reflector means, rod means provided with a knob external to said housing means for manual control thereof, and, torque transfer means to normally supply drive to said hub means and said rod means from said support means in predetermined time relationship with respect thereto.

18. A device as claimed in claim 17 in which said first reflector means comprises a prism positioned with at least one face angularly disposed with respect to the axis of said transparent drum.

19. In a device as claimed in claim 17 having a bracket secured in spaced relation to an inner wall of said housing means and wherein said torque transfer means includes, a stub shaft journaled in said bracket, first gear means adapted to transfer torque from said mirror support to an end of said stub shaft, second gear means adapted to transfer torque simultaneously to said rod means and to said hub means from the opposite end of said stub shaft, and tensile biasing means to urge said support means to rotate synchronously normally with said transparent drum means.

20. In a device as claimed in claim 17 and provided with a bracket secured in spaced relation to the inner wall of said housing means and wherein said torque transfer means includes, a stub shaft journaled for rotation in said bracket, pulley and belt means adapted to transfer torque from said mirror support to one end of said stub shaft, second pulley and belt means adapted to transfer torque simultaneously to said rod means and to said hub means from an opposite end of said stub shaft, and tensile biasing means to urge said support means to rotate synchronously with said transparent drum means.

21. In an optical oscillograph as claimed in claim 17 which is provided with a bracket secured in spaced relation to an inner wall of said housing means, and wherein said torque transfer means includes a first pulley disc affixed to said support means, a stub shaft rotatably journaled in said bracket, a second pulley disc affixed to one end of said stub shaft and a third pulley disc affixed to the opposite end of said stub shaft, a fourth pulley disc affixed to said rod means, a fifth pulley disc affixed to said hub means, first belt means operatively connecting said first pulley disc and said second pulley disc to effectively transfer torque therebetween, and, second belt means operatively connecting said third pulley disc to said fourth and fifth pulley discs to transfer torque therebetween.

22. In an optical oscillograph of the character described, a light source to produce light rays, a focusing lens to collimate said light rays into a light beam, at least one galvanometer unit adapted to receive an input electrical signal and physically oscillate in unison therewith, a first mirror secured to said galvanometer to intercept and reflect said light beam, a redirecting mirror provided with a pivotal mounting and movable into either of two positions, said redirecting mirror mounted to deflect said light beam when occupying the first of said two positions, a first lens adapted to receive and focus said light beam reflected from said redirecting mirror when occupying said first position, a movable surface provided with a light-sensitive coating and mounted to intercept said light beam focused by said first lens, a second mirror mounted to receive said light beam from said first mirror when said redirecting mirror occupies the second of said two positions and reflect said light beam angularly with respect to its previous path, a second lens mounted to focus said light beam reflected from said second mirror, a magazine-drum mounted to support a supply of light-sensitive material, a pair of drive drums adapted to exert traction on said light-sensitive material and move same to intercept said light beam which penetrates said second lens, a normally-open switch mounted to engage said redirecting mirror and operable to closed position thereby to permit current flow therethrough, means dependent upon the position of said switch to supply torque to said drive drums, and means to provide a series of linearly spaced timing lines on said light-sensitive material for analysis of patterns traced by said light beam thereupon.

23. In an optical oscillograph of the type described, means to produce light rays, normally-open switch means, means to collimate said light rays into a beam, oscillatory means to oscillate mechanically in response to an undulating electrical input signal, first mirror means attached to said oscillatory means to reflect and propagate said beam in a new direction, means operable only in a first position to intercept and redirect said beam traveling in said new direction and operable in a second position to close said normally-open switch means, means operable to intercept and deflect said beam propagated in said new direction only when said normally-open switch means occupies a closed position, means to focus said beam when deflected, light-sensitive means, means to move said light-sensitive means to intercept said beam when deflected only when said normally-open switch occupies said closed position, and means to provide a linearly spaced series of timing lines on said light-sensitive means.

24. In an optical oscillograph for visually depicting seismic data previously recorded on a magnetic recorder-reproducer unit including a drive motor, a transparent cylinder journaled for rotation in said oscillograph and provided with a light-sensitive coating on the outer axial surface thereof, means for supplying torque to said cylinder directly from the drive motor of said recorder-reproducer unit to rotate said cylinder at a first angular velocity and insure positive synchronization therebetween, a mirror supported within said cylinder obliquely with respect to the axial center line thereof; a hub provided with a bore therethrough axially aligned with said cylinder, said hub journaled for rotation in said oscillograph; a transparent, solid, trapezoidal prism centrally secured within said bore to receive light rays from said mirror, said prism including a pair of parallel opposite sides disposed parallel to the axis of said bore; and means to rotate said hub and prism at one-half the value of said first angular velocity, whereby said mirror and said prism produce an apparently stationary image embracing a single section of said cylinder.

25. In an optical oscillograph for pictorially depicting seismic exploration data previously recorded on a magnetic recorder-reproducer unit including a drive motor, a housing, a transparent hollow drum journaled for rotation in said housing and provided with a light-sensitive coating on the outer axial periphery, means for driving said drum directly from the drive motor of said recorder-reproducer unit to insure substantially perfect synchronism therebetween and revolve said drum at a given rotational speed, a mirror obliquely secured in said drum with respect to its axis to reflect images traced on the outer axial periphery of said hollow drum, a hub provided with a bore therethrough axially aligned with said drum and journaled for rotation within said housing, a transparent, solid trapezoidal prism centrally secured within said bore and provided with a pair of parallel opposite sides axially aligned therewithin to effectively rotate an image seen through said prism 360° for each 180° angular displacement thereof, means to rotate said prism to revolve at one-half the value of said first rotational speed, means to trace a pattern on said light-sensitive surface in unison with the undulations in value of an incoming electrical signal, whereby said mirror and said prsm effectively combine to produce an apparently stationary image which embraces a single section of the axial periphery of said drum.

26. In an optical oscillograph for visually depicting seismic data previously recorded on a magnetic recorded-reproducer unit, a transparent cylinder journaled for rotation in said oscillograph and provided with a light-sensitive coating on the outer axial surface thereof, means for supplying torque to said transparent cylinder to effectively rotate same at a first angular velocity, a mirror supported within said cylinder obliquely with respect to the axis thereof, a hub provided with a bore therethrough axially aligned with said cylinder; a truncated triangular solid prism centrally secured within said bore and provided with a first pair of angularly disposed flat planes, and a second pair of parallel flat planes intersecting said first pair of planes, said second pair of planes disposed parallel to the axis of said bore; and means to rotate said truncated triangular solid prism and associated hub at one-half the value of said first angular velocity, whereby said mirror and said prism produce an apparently stationary image embracing a single section of said cylinder.

27. In a system for obtaining a graphical record of acoustic signals, in combination, a recorder-reproducer unit to record said acoustic signals, an oscillograph provided with a housing, transparent drum means mounted for rotation within said housing and provided with a light-sensitive outer surface, means to produce an oscillating light beam and direct same into contact with said light-sensitive surface to provide a luminescent pattern thereupon, shaft means connected to said drum means to deliver torque thereto, first reflector means mounted within said drum means to read the luminous pattern thereupon, differential means to change the relative angularity of said first reflector means with respect to said drum means, friction clutch means to permit said first reflector means to momentarily revolve at an angular velocity different from that of said drum means, second reflector means aligned with said first reflector means to reflect images therein and provide an apparently stationary image by revolving at substantially one-half the angular velocity thereof; torque transfer means to revolve said second reflector means, said differential means and said first reflector means in controlled time relationship, recorder means including a motor to move a light-sensitive strip to intercept said light beam and provide a record thereof, means for actuating said motor, and, means coupling said shaft means to said recorder-reproducer unit to obtain a driving torque therefrom, and provide a positive synchronization between said recorder-reproducer unit and said oscillograph.

28. In a system for obtaining a graphical record of an acoustic signal, in combination, a recorder-reproducer unit to record said acoustic signals, an optical oscillograph provided with a housing, at least one light source to produce a beam of light within said housing, a transparent rotatable means including a light-sensitive surface thereon to intercept said beam of light, means to rotate said rotatable means by direct drive from the motor of said recorder-reproducer unit to effect a positive synchronization therebetween, means to oscillate the light beam from said light source and focus said beam on said light-sensitive surface, reflector means mounted within said rotatable means to normally rotate synchronously therewith and reflect patterns transmitted through the inner surface thereof, a hub provided with an axial bore aligned with the axis of said transparent rotatable means and journaled for rotation at a controlled rate with respect thereto, means for rotating said hub at one-half the angular velocity of rotation of said transparent rotatable means, friction clutch means to permit said reflector means to slip with respect to said transparent rotatable means, and, torque transfer means to revolve said transparent rotatable means and said reflector means in controlled time relationship.

29. In an optical oscillograph of the character described, a transparent hollow drum provided with a light-sensitive coating on the outer axial surface thereof and rotatably mounted within said oscillograph, a supply of light-sensitive material, a magazine drum rotatably mounted to support said supply of light-sensitive material, drum means mounted to exert traction on said light-sensitive material and impart movement to same, a redirecting mirror pivotally mounted and operable in either a first or a second position, means operable only when said redirecting mirror occupies said second position to actuate said drum means to move said light-sensitive material, a galvanometer unit to receive an input signal and provide a light beam which oscillates substantially in unison therewith, said galvanometer mounted to cause said light beams to impinge upon said light-sensitive coating of said hollow drum when said redirecting mirror occupies said first position and to impinge upon said light-sensitive material when said redirecting mirror occupies said second position.

30. In an optical oscillograph of the character described, a transparent hollow drum provided with a light-sensitive coating on the peripheral surface thereof and journaled for rotation within said oscillograph, a magazine-drum rotatably mounted within said oscillograph to support a supply of light-sensitive material, a redirecting mirror pivotally mounted and operable in either a first or a second position, means mounted to exert traction on said light-sensitive material and unspool same from said magazine-drum when said redirecting mirror occupies the second of said positions, a galvanometer bank connected to receive input electrical signals and oscillate a light beam substantially in phase therewith, said light beam energizing said light-sensitive coating of said hollow drum when said redirecting mirror occupies the first of said two positions and impinging upon said light-sensitive material when said redirecting mirror occupies the second of said two positions.

31. In an optical oscillograph of the type described, means to produce light rays and collimate same, rotatable light-sensitive means, two-position mirror means operable only in a first position to intercept and redirect said collimated rays to excite said light-sensitive rotatable means, traversable strip means adapted to intercept said collimated rays and permanently record same only when said two-position mirror means occupies the second of said two positions, a galvanometer bank connected to receive an undulating input signal and oscillate said collimated beam substantially in unison therewith, said galvanometer bank mounted to reflect said collimated beam to impinge upon said two position mirror when in said first position, and said galvanometer further mounted to direct said collimated rays to impinge upon said traversable strip means when said two-position mirror occupies the second of said two positions.

32. In an optical oscillograph characterized by means to produce an oscillating light beam and provided with a housing, and a bracket secured to the inner wall of said housing having at least one cylindrical hole therethrough, a rotatable light-sensitive drum surface to intercept said light beam, a first reflector means mounted within said drum surface receiving the pattern traced by said light beam thereupon, and an image inversion means which includes a hub provided with a hollow axial bore and journaled between said housing and said bracket for concentric rotation with said cylindrical hole therein, and a second reflector supported in said hub to read images reflected from said first reflector.

33. In an optical oscillograph as defined in claim 32 wherein said second reflector is a truncated triangular solid prism with a first pair of angularly disposed flat planes and a second pair of parallel flat planes intersecting said first pair of planes.

34. An optical oscillograph for visually displaying and recording previously recorded data signals including means for producing light beams oscillating in accordance with the undulations of said previously recorded signals, means directing said light beams onto a phosphorescent surface, said surface being the outer axial surface of a rotatable transparent drum, means moving said phosphorescent surface past said light beams thereby producing on the inner surface of said drum a visual graphical plot of the oscillations of said light beams against time, means reflecting an image of a portion of said visual graphical plot to a viewing aperture, optical means causing said image to appear stationary, and means operable to prevent said oscillating light beams from striking said phosphorescent surface and direct said light beams to a photographic recording means producing thereby a permanent visual record of said beam oscillations with respect to time.

35. An optical oscillograph as defined in claim 34 including means operable to change the field of view of said image to a different portion of said visual graphical plot.

36. An optical oscillograph as defined in claim 35 wherein the rotational speed of said rotatable drum is normally synchronized with a means reproducing said previously recorded signals.

References Cited in the file of this patent

UNITED STATES PATENTS 888,236   Hattu _______________ May 19, 1908

(Other references on following page)

UNITED STATES PATENTS

| | | |
|---|---|---|
| 1,139,476 | Blondel | May 18, 1915 |
| 1,867,176 | Rieckmann | July 12, 1932 |
| 2,454,959 | Barnes | Nov. 30, 1948 |
| 2,482,813 | Urbach | Sept. 27, 1949 |
| 2,604,955 | Hawkins | July 29, 1952 |
| 2,620,898 | Lee et al. | Dec. 9, 1952 |

FOREIGN PATENTS

| | | |
|---|---|---|
| 263,797 | Germany | Sept. 11, 1913 |

OTHER REFERENCES

Jakosky and Jakosky: "Frequency Analysis of Seismic Waves," Geophysics magazine, volume 17, No. 4, pages 721 to 728, October 1952.